United States Patent [19]

Winters

[11] 3,777,219

[45] Dec. 4, 1973

[54] ELECTROMAGNETIC PULSE SUPPRESSOR

[75] Inventor: Richard D. Winters, Tempe, Ariz.

[73] Assignee: General Semiconductor Industries, Inc., Tempe, Ariz.

[22] Filed: Aug. 14, 1972

[21] Appl. No.: 272,355

[52] U.S. Cl. .................... 317/61.5, 317/68, 317/71, 338/20, 338/216, 338/220, 333/97 R

[51] Int. Cl. .................... H02h 3/22

[58] Field of Search .................... 338/20, 21, 216, 338/220; 317/31, 61.5, 67, 68, 71; 333/97 R, 81 R, 96; 174/51, 52, 55

[56] References Cited

UNITED STATES PATENTS

| | | | |
|---|---|---|---|
| 2,896,128 | 7/1959 | Fuller | 317/31 |
| 3,711,794 | 1/1973 | Tasca | 338/216 |
| 3,227,983 | 1/1966 | Braun | 338/21 |
| 3,453,564 | 7/1969 | Russell | 333/81 |
| 2,440,748 | 5/1948 | Johnson | 338/21 |

*Primary Examiner*—J. D. Miller
*Assistant Examiner*—Harvey Fendelman
*Attorney*—William C. Cahill et al.

[57] ABSTRACT

Apparatus is disclosed for protecting electronic circuitry against the damaging and destructive effects of fast rise time electromagnetic pulses. The apparatus is inserted between two coaxial cables, where the coaxial cables are used to interconnect electronic equipment. The housing of the apparatus electrically interconnects the sheaths of the coaxial cables and includes a central cavity having a solid conductor extending therethrough. The solid conductor provides an electrical path between the central conductors of the two coaxial cables. Protective devices, of the silicon junction avalanche type, fit within the cavity. These protective devices, or suppressors, are characterized by their small size, usually small discs, and their short duration, large current handling capability. One side of these discs is physically and electrically secured to the solid conductor while the other side is physically and electrically secured to the housing by a threaded element, such as a bolt. A plurality of serially connected discs may be used by stacking the discs within the cavity so that one side of the stack is adjacent the solid conductor with the bolt engaging the other side of the stack. The absence of leads in the above-described structure minimizes the inductive effects of the apparatus. In operation, a rapid potential increase on the central conductor, such as might occur due to an induced electromagnetic pulse, is dissipated through the one or more discs and thereby the discs suppress the damaging or destructive effect of the accompanying large current increase on the central conductor within the coaxial cables.

10 Claims, 2 Drawing Figures

ELECTROMAGNETIC PULSE SUPPRESSOR

The present invention relates to protective devices for suppressing short duration, large current pulses and more particularly, for protecting electronic circuitry interconnected via coaxial cables.

The need for voltage surge protective devices within electrical and electronic circuitry is well known in the art. In fact, the prior art is replete with different attempts at obtaining the ultimate in protective devices. Within this field, semiconductors are probably among the most useful devices for clamping or protecting electronic circuitry. These semiconductors include zener diodes and silicon controlled rectifiers which conduct abruptly upon avalanche breakdown or upon triggering. These semiconductor protective devices, though beneficial and advantageous in many respects, present certain problems. First, the impedance of these devices collapses to a lower value as they conduct which usually requires the addition of a series impedance to dissipate the surge in energy and limit the magnitude of the power follow current. Second, the assembly for housing and connecting the semiconductors to the line introduces certain disadvantages. The usual requirement for leads to connect the semiconductor between the line and ground potential tends to make the protective device inductive, which inductance tends to produce high peak voltage transients. Further, any increases in inductance of the protective device delays the power dissipation and reduces its effectiveness. Third, the necessity for leads, whether to connect a series impedance or to connect the semiconductor to the housing, presents a further disadvantage in that the ease of installation and replacement is inherently more complex and more costly.

It is therefore a primary object of the present invention to provide a surge suppressor having a minimum response time.

Another object of the present invention is to provide a housing for a semiconductor suppressor.

Yet another object of the present invention is to provide a semiconductor suppressor which may be inserted into any coaxial line.

A further object of the present invention is to provide a housing for a semiconductor suppressor, which housing permits stacking of a plurality of semiconductor elements.

These and other objects of the present invention will become apparent to those skilled in the art as the description thereof proceeds.

The present invention may be understood with more specificity and clarity with reference to the following figures.

Figure 1:
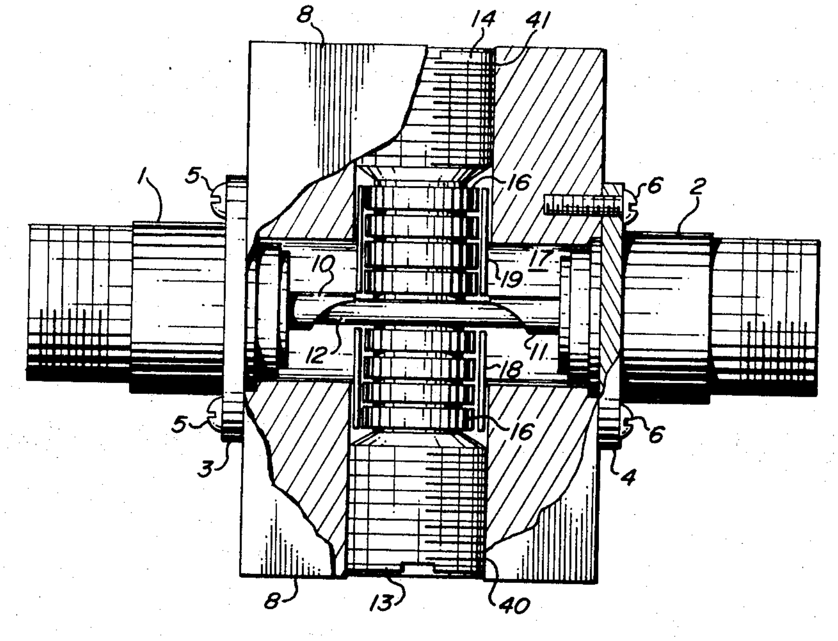
FIG. 1 illustrates a cross-sectional view of the present invention.

Referring to FIG. 1, there is shown a cross-sectional view of the present invention. A housing 8 of electrically conductive material includes a centrally disposed cavity 17. A first coaxial connector 1 including a mounting plate 3 is secured to housing 8 by bolts 5, the latter extending through holes within the mounting plate. Similarly, a second coaxial connector 2 including a mounting plate 4 is secured to housing 8 by bolts 6, the latter extending through holes within the mounting plate.

The coaxial connectors 1 and 2 are of standard configuration for "screw on" coaxial connectors. As such, the threaded portion of the male connector is electrically, as well as physically, connected to the threaded portion of a female "screw on" connector attached to a coaxial cable (not shown). These threaded portions of the connectors are electrically connected to the sheath forming a part of the coaxial cable. Thus, the housing, being electrically conductive, not only interconnects the threaded portions of connectors 1 and 2 but electrically interconnnects the sheaths of the attached coaxial cables. The sheaths, and therefore housing 8, are all at a reference potential, usually ground.

Each of the connectors 1 and 2 also includes a central conductor electrically insulated from the threaded portion of the connector. Each of these central conductors mates with a central conductor within the respective attached coaxial cable. The central conductors within the coaxial cables are electrically insulated from the respective sheaths.

In the present invention, a central conductor 12, electrically insulated from housing 8, extends through the cavity 17 to each of the central conductors of connectors 1 and 2. In this manner, the electrical integrity between the central conductors within each of the attached coaxial cables is maintained.

Housing 8 includes a pair of threaded passageways 40 and 41 extending into cavity 17. The axis of threaded passageways 40 and 41 are generally aligned with and perpendicular to the central connector 12 disposed within cavity 17. One or more suppressors 16, such as the devices known by the registered trademark TransZorb$^R$, which trademark is owned by General Semi-Conductor Industries, Inc., are stacked within passageways 40 and 41 and positioned in a contacting relationship with central conductor 12. Sleeves 18 and 19 are disposed within passageways 40 and 41, respectively, and encircle the stacks of protective devices 16 to maintain alignment therebetween.

A pair of screws 13 and 14 threadably engage passageways 40 and 41, respectively. These screws 13 and 14 are turned to apply pressure on the suppressors 16 to force them to positively contact the central conductor 12. The same applied pressure also forces the suppressors 16 to positively contact one another if two or more devices are stacked on top of one another. In this manner, both electrical continuity and mechanical rigidity are obtained between the central conductor 12 and the adjacent stacks of suppressors 16. The screws 13 and 14 are of electrically conductive material and provide an electrical path between the housing 8 and the suppressor 16 contacting one of the screws.

To prevent arcing between the central conductor 12 and the housing 8, a pair of electrical shields 10 and 11 extend from connectors 1 and 2, respectively, into cavity 17. These shields 10 and 11 are concentric with central conductor 12 and extend from connectors 1 and 2 to the vicinity of the side of suppressor 16.

Although the preferred embodiment is shown as including diametrically opposed discs, it is to be understood that a single disc or a single stack of discs may also be used.

Figure 2:
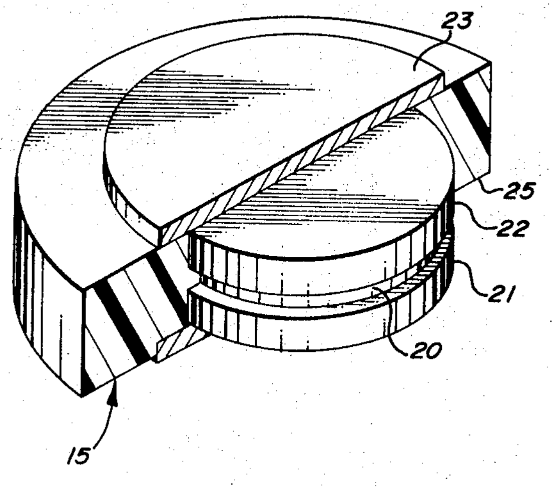
FIG. 2 illustrates a cross-sectional view of a TransZorb$^R$ cell.

The TransZorb$^R$cell discussed above is shown more clearly in FIG. 2. It is a silicon junction avalanche semiconductor which is characterized by a short duration, large current handling capability. Typically, it is capable of dissipating 30,000 watts for one microsecond, or 100,000 watts for 100 nanoseconds.

In the preferred embodiment, each suppressor 16 includes a pair of TransZorb$^R$ cells joined to form a disc 15. A conductor 20 is disposed between the two TransZorb$^R$ cells 21 and 22. The two TransZorb$^R$ cells 21 and 22 are sandwiched between two copper discs 23 and 24, each TransZorb$^R$ cell being electrically connected to the adjacent copper disc. Epoxy material 25 is formed about the periphery of the sandwiched components to provide both additional rigidity and a specified physical dimension of the disc 15.

The operational speed of a protective device in dissipating the power generated by induced electromagnetic pulses is of prime importance to effectively prevent damage to electronic circuitry. To prevent transient voltage spikes and delaying the dissipating of the induced pulses, the inductance of the device must be at a minimum. By using a bi-directional device as shown in FIG. 1, two current paths orthogonal to the conductor are provided. The effect of the two current paths is that of setting up inductive effects which tend to cancel one another to minimize the total inductive effect of the device.

The TransZorb$^R$ cells are polarized units, that is, one circular side is an anode while the other is a cathode. Thus, the discs 15 may be assembled in either an anode-cathode-cathode-anode or an anode-cathode-anode-cathode configuration. The disc 15, when assembled in a back-to-back configuration, that is, anode-cathode-cathode-anode, offer a significant reduction of capacitance as compared to an anode-cathode-anode-cathode configuration. This results because the capacitances of the TransZorb$^R$ cells are in series rather than in parallel. With faster response or clamp times, there is also an additional benefit of less attenuation at high frequencies and less insertion loss.

The lack of any leads between the central connector 12 and the disc 15 and between the disc 15 and the housing 8 reduces the inductance of the present invention as compared with prior art protective devices which did reguire connecting leads. Thus, the structure of the present invention minimizes the inductive effect of connecting a protective device to a line by minimizing the elements required to provide a high voltage electrical path between a line and a reference potential.

In operation, the present invention will protect electrical conduits and electronic circuitry from electromagnetic pulses by the avalanche characteristic of silicon junction semiconductors. When the avalanche threshold is reached, the semiconductor acts as a closed circuit and permits dissipation of the power surge to ground. It has been found by testing that the effectiveness of suppressor devices is more affected by insertion technique and geometry of the device than by the inherent characteristics of the silicon junction. For these reasons, the electromagnetic pulse suppressor of the present invention was configured to optimally satisfy the geometry dictated by experimentation.

While the principles of the invention have now been made clear in an illustrative embodiment, there will be immediately obvious to those skilled in the art many modifications of structure, arrangement, proportions, the elements, materials, and components, used in the practice of the invention which are particularly adapted for specific environments and operating requirements without departing from those principles.

I claim:

1. An electrical surge suppressor for dissipating power surges, said suppressor comprising:

connection means for inserting said suppressor within an electrical circuit;

a housing disposed intermediate said connection means;

an electrical path extending through said housing intermediate said connection means for maintaining continuity of said circuit:

imperforate wafer semiconductor means disposed within said housing, said semiconductor means being of the silicon junction avalanche type having a threshold voltage; and lead-less retaining means for mounting said semiconductor means intermediate a part of said housing and said electrical path to establish a direct electrical contact between said electrical path and said housing through said semiconductor means when said semiconductor means is conducting; whereby said semiconductor means, normally non-conducting, will conduct and dissipate a power surge from said electrical path to said housing when the threshold voltage is reached.

2. The suppressor as set forth in claim 1 wherein said connection means comprises coaxial connectors having an insulated central conductor for inserting said suppressor within a coaxial cable.

3. The suppressor as set forth in claim 2 wherein the electrical path comprises a conductor interconnecting said insulated central conductors of said coaxial connectors.

4. The suppressor as set forth in claim 3 wherein said housing includes a central cavity disposed about said conductor for insulating said conductor from said housing.

5. The suppressor as set forth in claim 4 wherein said semiconductor means is configured as a disc, said disc being in physical contact with the central part of said conductor.

6. The suppressor as set forth in claim 5 including a plurality of said discs stacked on top of one another wherein said housing includes a circular cavity disposed orthogonal to said conductor for receiving a plurality of said discs stacked on top of one another.

7. The suppressor as set forth in claim 6 further including a sleeve disposed about said stacked discs for maintaining alignment of said discs within said central cavity.

8. The suppressor as set forth in claim 7 including a pair of circular insulators disposed about said central conductor and extending from each of said connectors toward said disc for inhibiting arcing between said conductor and said housing.

9. The suppressor as set forth in claim 8 wherein said retaining means comprises a screw threadedly engaging said circular cavity for retaining said stack of discs adjacent said conductor.

10. The suppressor as set forth in claim 5 including a plurality of said discs stacked on top of one another in two stacks, wherein said housing includes a pair of circular cavities disposed diametrically opposite to one another and orthogonal to said conductor, each of said pair receiving one of said stacks of discs.

* * * * *